(12) United States Patent
Sharma et al.

(10) Patent No.: US 7,827,442 B2
(45) Date of Patent: Nov. 2, 2010

(54) SHELF MANAGEMENT CONTROLLER WITH HARDWARE/SOFTWARE IMPLEMENTED DUAL REDUNDANT CONFIGURATION

(75) Inventors: Viswa N. Sharma, San Ramon, CA (US); Breton A. Ketchum, Anoka, MN (US)

(73) Assignee: SLT Logic LLC, Boston, MA (US)

( * ) Notice: Subject to any disclaimer, the term of this patent is extended or adjusted under 35 U.S.C. 154(b) by 323 days.

(21) Appl. No.: 11/626,334

(22) Filed: Jan. 23, 2007

(65) Prior Publication Data

US 2007/0255430 A1 Nov. 1, 2007

Related U.S. Application Data

(60) Provisional application No. 60/761,129, filed on Jan. 23, 2006, provisional application No. 60/743,761, filed on Mar. 24, 2006.

(51) Int. Cl.
G06F 11/00 (2006.01)
G06F 11/20 (2006.01)

(52) U.S. Cl. .................................. 714/10; 714/13

(58) Field of Classification Search ............. 714/9, 714/43, 10, 13
See application file for complete search history.

(56) References Cited

U.S. PATENT DOCUMENTS

| | | | |
|---|---|---|---|
| 3,868,158 A | 2/1975 | Laboue | |
| 3,874,444 A | 4/1975 | Perce et al. | |
| 4,126,269 A | 11/1978 | Bruges | |
| 4,187,058 A | 2/1980 | Fish | |
| 4,453,785 A | 6/1984 | Smith | |
| 5,031,070 A | 7/1991 | Hsu | |
| 5,136,464 A | 8/1992 | Ohmori | |
| 5,268,637 A | 12/1993 | Liken et al. | |
| 5,409,419 A | 4/1995 | Euchner et al. | |
| 5,412,534 A | 5/1995 | Cutts et al. | |
| 5,528,454 A | 6/1996 | Niklos | |

(Continued)

OTHER PUBLICATIONS

AdvancedTCA PICMG 3.0 Short Form Specification published Jan. 2003, retrieved Mar. 16, 2009 http://www.picmg.org/pdf/PICMG_3_0_Shortform.pdf.*

(Continued)

*Primary Examiner*—Scott T Baderman
*Assistant Examiner*—Joseph Schell
(74) *Attorney, Agent, or Firm*—Patterson Thuente Christensen Pedersen, P.A.

(57) ABSTRACT

A fault tolerant, multi-protocol shelf management controller architecture that is extensible provides an intelligent platform management interface that is version indifferent as well as programmable and reconfigurable. The shelf management controller is arranged in a dual redundant configuration in a client-server mode and has a message driven configuration with the messages conforming to the Intelligent Platform Management Interface (IPMI) specification as extended by PICMG 3.0. In one embodiment, each shelf management controller includes at least one bit stream processor comprising sequenced stage machines implementing one or more finite state machines associated with one or more devices that are under control of the shelf management controller. The finite state machines could be hardware or software based. The shelf management controller is also modeled as a layered architecture that includes an IPMI API layer. The IPMI API layer enables the shelf manager to interface with legacy and future IPMI specifications.

12 Claims, 8 Drawing Sheets

U.S. PATENT DOCUMENTS

| | | |
|---|---|---|
| 5,557,506 A | 9/1996 | Wood et al. |
| 5,680,294 A | 10/1997 | Stora et al. |
| 5,751,549 A | 5/1998 | Eberhardt et al. |
| 5,949,646 A | 9/1999 | Lee et al. |
| 5,982,634 A | 11/1999 | Wronski |
| 6,166,917 A | 12/2000 | Anderson |
| 6,181,570 B1 | 1/2001 | Ellebrecht et al. |
| 6,253,266 B1 | 6/2001 | Ohanian |
| 6,320,760 B1 | 11/2001 | Flamm et al. |
| 6,370,605 B1 * | 4/2002 | Chong, Jr. ............... 710/33 |
| 6,456,498 B1 | 9/2002 | Larson et al. |
| 6,466,449 B1 | 10/2002 | Sheen et al. |
| 6,496,376 B1 | 12/2002 | Plunkett et al. |
| 6,504,717 B1 | 1/2003 | Heard |
| 6,522,539 B2 | 2/2003 | Ota et al. |
| 6,607,402 B2 | 8/2003 | Cohen et al. |
| 6,661,673 B2 | 12/2003 | Brooks et al. |
| 6,693,901 B1 | 2/2004 | Byers et al. |
| 6,704,196 B1 | 3/2004 | Rodriguez et al. |
| 6,708,372 B2 | 3/2004 | Stewart |
| 6,795,314 B1 | 9/2004 | Arbogast et al. |
| 6,805,560 B1 | 10/2004 | Budny et al. |
| 6,900,387 B2 | 5/2005 | Gravell et al. |
| 6,934,786 B2 | 8/2005 | Irving et al. |
| 6,935,868 B1 | 8/2005 | Campini et al. |
| 6,944,020 B2 | 9/2005 | Wintersteen et al. |
| 6,968,958 B2 | 11/2005 | Lauchner et al. |
| 6,985,967 B1 | 1/2006 | Hipp |
| 7,013,352 B2 | 3/2006 | Garnett |
| 7,083,422 B2 | 8/2006 | Campini et al. |
| 7,099,160 B1 | 8/2006 | Ice |
| 7,101,188 B1 | 9/2006 | Summers et al. |
| 7,120,739 B2 * | 10/2006 | Fujimoto et al. ............ 711/113 |
| 7,159,062 B2 | 1/2007 | Byers et al. |
| 7,172,432 B2 | 2/2007 | Campini et al. |
| 7,200,003 B2 | 4/2007 | Hood et al. |
| 7,239,509 B1 | 7/2007 | Roeske |
| 7,259,961 B2 | 8/2007 | Lucero et al. |
| 7,293,090 B1 * | 11/2007 | Saleh et al. ............. 709/226 |
| 7,324,348 B2 | 1/2008 | Berg et al. |
| 7,370,223 B2 * | 5/2008 | Olmstead et al. ............... 714/4 |
| 7,388,757 B2 | 6/2008 | Moakes et al. |
| 7,509,375 B2 * | 3/2009 | Christian et al. ............ 709/205 |
| 7,516,263 B2 | 4/2009 | Sandy et al. |
| 7,603,580 B2 * | 10/2009 | Zohar et al. ................... 714/6 |
| 2003/0130969 A1 | 7/2003 | Hawkins et al. |
| 2003/0152074 A1 | 8/2003 | Hawkins et al. |
| 2003/0182483 A1 | 9/2003 | Hawkins |
| 2004/0073834 A1 | 4/2004 | Kermaani et al. |
| 2004/0264145 A1 | 12/2004 | Miller et al. |
| 2005/0141207 A1 | 6/2005 | Campini |
| 2005/0280986 A1 | 12/2005 | Coglitore et al. |
| 2005/0281014 A1 | 12/2005 | Carullo et al. |
| 2006/0002098 A1 | 1/2006 | Berg, Jr. et al. |
| 2006/0023384 A1 * | 2/2006 | Mukherjee et al. .......... 361/103 |
| 2006/0036793 A1 | 2/2006 | Sandy et al. |
| 2006/0044756 A1 | 3/2006 | Wong |
| 2006/0114923 A1 * | 6/2006 | Overgaard .................. 370/425 |
| 2006/0221559 A1 | 10/2006 | Campini et al. |
| 2006/0221581 A1 | 10/2006 | DeNies et al. |
| 2007/0038732 A1 * | 2/2007 | Chandwani et al. ......... 709/223 |
| 2007/0121306 A1 | 5/2007 | Moakes et al. |
| 2007/0217172 A1 | 9/2007 | Bisbikis et al. |
| 2008/0037218 A1 | 2/2008 | Sharma et al. |
| 2008/0062667 A1 | 3/2008 | Campini et al. |
| 2009/0097200 A1 | 4/2009 | Sharma et al. |

OTHER PUBLICATIONS

Micro Telecommunications Computing Architecture Short Form Specification, PICMG® MTCA.0 R1.0, pp. 1-34, copyright 2006.
Advanced MC Short Form Specification, PICMG ® AMC.0 R2.0, pp. 1-56. copyright 2006.
Application and File History of U.S. Appl. No. 11/728,718, filed Mar. 23, 2007, Inventors Sharma et al.
Application and File History of U.S. Appl. No. 12/101,739, filed Apr. 11, 2008, Inventors Sharma et al.
Application and File History of U.S. Appl. No. 12/131,473, filed Jun. 2, 2008, Inventors Sharma et al.
Application and File History of U.S. Appl. No. 12/696,963, filed Jan. 29, 2010, Inventors Sharma et al.
PCT Patent Application No. PCT/US2008/004741; filed Apr. 11, 2008; Applicant SLT Logic LLC; Written Opinion dated Nov. 12, 2008.
PCT Patent Application No. PCT/US2008/004741; filed Apr. 11, 2008; Applicant SLT Logic LLC; Search Report dated Nov. 12, 2008.
PCT Patent Application No. PCT/US2007/07490; filed Mar. 26, 2007; Applicant SLT Logic LLC; Written Opinion dated Mar. 21, 2008.
PCT Patent Application No. PCT/US2007/07490; filed Mar. 26, 2007; Applicant SLT Logic LLC; Search Report dated Mar. 21, 2008.

* cited by examiner

SHELF MANAGEMENT CONTROLLER WITH HARDWARE/SOFTWARE IMPLEMENTED DUAL REDUNDANT CONFIGURATION

RELATED APPLICATIONS

The present invention claims the benefit of U.S. Provisional Application No. 60/761,129, filed Jan. 23, 2006, and entitled "SHELF MANAGEMENT CONTROLLER WITH HARDWARE/SOFTWARE IMPLEMENTED DUAL REDUNDANT CONFIGURATION," and U.S. Provisional Application No. 60/743,761, filed Mar. 24, 2006, entitled "MODULAR CHASSIS-PROVIDING SCALABLE MECHANICAL, ELECTRICAL AND ENVIRONMENTAL FUNCTIONALITY FOR MICROTCA CARRIER BOARDS," the disclosures of each of which are hereby incorporated by reference. The present invention is also related to the U.S. patent application Ser. No. 11/466,367, entitled "OMNI-PROTOCOL ENGINE FOR RECONFIGURABLE BIT-STREAM PROCESSING IN HIGH-SPEED NETWORKS," filed Aug. 22, 2006, which is assigned to the assignee of the present invention and the disclosure of which is hereby incorporated by reference.

FIELD OF THE INVENTION

The present invention relates to system management of AdvancedTCA and microTCA compliant communication and computing equipment architectures. In particular, the present invention relates to fault tolerant, multiprotocol shelf management controller architectures that are extensible, programmable, interface indifferent and reconfigurable.

BACKGROUND OF THE INVENTION

The telecom marketplace is being shaped by exploding data rates, near-convergence of video, data, voice, wireless and VoIP and a global demand for networks and telecom applications characterized by high availability, optimum performance and reduced capital expenditures. One of the hallmarks of this marketplace is the vast array of disruptive technologies that rapidly obsolete competing legacy technologies. In the wake of the recent telecom retrenchment after the burst of the Internet boom, telecom equipment manufacturers have responded to this new wave of disruptive technologies by adopting standardized architectures over proprietary solutions.

The AdvancedTCA (Advanced Telecom Computing Architecture, hereinafter "ATCA") is one of the new standards gaining widespread acceptance for design and deployment of next generation of telecommunication and computer networking equipment. The core ATCA specification adopted by the PCI Industrial Computer Manufacturers Group (PICMG 3.0) is a chassis, backplane, power, shelf management, clock and base interface specification targeted to the next generation of telecommunications and networking equipment. The ATCA specification covers the details of the mechanical construction, the system management, power distribution, data transport, thermal loading and power connectors to provide an open communication architecture framework for building next generation high-availability, high density systems.

The ATCA specification supports high-speed interconnections, active monitoring and control of the various modules with reliability exceeding "five-nines" (99.999%) availability. One of the features that makes it possible to achieve such a level of reliability, is a mandatory shelf management component that addresses monitoring and control of thermal load, power handling, and system health in general at a shelf level. The shelf management component is governed by extensive requirements set forth in the PICMG and Intelligent Platform Management Interface (IPMI) specifications well known in the art. The IPMI comprises a main controller called the Baseboard Management Controller (BMC) and remote controllers. The remote controllers within the same chassis are connected to the BMC via the system interface called IPMB (Intelligent Platform Management Bus/Bridge). IPMB is an enhanced implementation of I$^2$C (hereinafter "I2C" is an acronym for Inter Integrated Circuit bus). The BMC connects to remote controllers or another BMC in another chassis via IPMC (Intelligent Platform Management Chassis) bus/bridge.

I$^2$C (hereinafter "I2C") is an acronym for Inter Integrated Circuit bus. I2C is a 2-wire serial interface standard defined by Philips Semiconductor to provide an easy way to connect a CPU to peripheral chips. The bus physically consists of 2 active, bi-directional wires (the serial data line and the serial clock line) and a ground connection that allows full duplexed communication between a plurality of devices. The I2C interface is a simple master/slave type interface wherein a device that controls signal transfers on the line as well as the clock frequency is designated the master and a device that is controlled by the master is designated the slave. The master can transmit or receive signals to or from a slave, respectively, or control signal transfers between two slaves, where one is the transmitter and the other is the receiver. I2C bus supports more than one master connected to one bus. In typical cases, the microcontroller acts as the master and the external peripheral devices act as the slaves.

A shelf manager is mandated by the AdvancedTCA specification and therefore, must be capable of being integrated with other modular components to construct platform-independent, telecommunication and networking equipment solutions. However, it will readily be evident to one skilled in the art that a shelf may include diverse features and functions provided by a combination of proprietary and open communication standards based devices, cards, blades or other similar components. Typically, the proprietary features and functions are provided by using dedicated hardware components/systems or software specifically tailored for the particular shelf configuration. Conventional shelf manager solutions lack the flexibility to accommodate changes in the standard of either the shelf manager or the components that are part of the shelf without extensive redesign. It would be advantageous to provide a low cost system capable of being configured for transparent porting of legacy as well as non-legacy applications. In particular, these approaches do not offer a cost advantage for MicroTCA standard compliant applications because the MicroTCA standard is geared toward smaller scale and more price sensitive applications.

SUMMARY OF THE INVENTION

The present invention is a low-cost, fault tolerant shelf management controller used for shelf management of AdvancedTCA and the MicroTCA specification compliant shelf architectures that can be reconfigured for legacy as well as non-legacy applications resulting from multiple versions of an evolving specification.

The shelf management controller is arranged in a dual redundant configuration in an active-standby mode, alternately referred to as the master-slave, server-client. In accordance with the AdvancedTCA specification, the shelf management controller architecture is specified by the Intelligent Platform Management Interface (IPMI) specification as extended by PICMG 3.0. In one embodiment, each shelf management controller includes at least one bit stream processor comprising sequenced stage machines implementing one or more finite state machines associated with one or more devices that are under control of the shelf management controller. The finite state machines may be hardware or software based.

In another embodiment, the shelf management controller is modeled as a layered architecture which includes at least one IPMI API layer. The IPMI API layer enables the shelf manager to adapt to legacy and future IPMI specifications. The API also insulates the controller code from the need to know the details of the interfaces used to communicate with other Baseboard Management Controllers (BMC)s.

In another embodiment, the shelf management controller architecture is configured into a layered architecture with the layered functionality provided by a combination of reconfigurable hardware and software architecture that lends itself to a plurality of controllers including, for example, the modular management controller (MMC), the Carrier Intelligent Platform Management Controller (Carrier IPMC), the Shelf Management Controller (ShMC) and the MicroTCA Carrier Management Controller.

BRIEF DESCRIPTION OF THE DRAWINGS

The invention may be more completely understood in consideration of the following detailed description of various embodiments of the invention in connection with the accompanying drawings, in which.

Figure 1A:
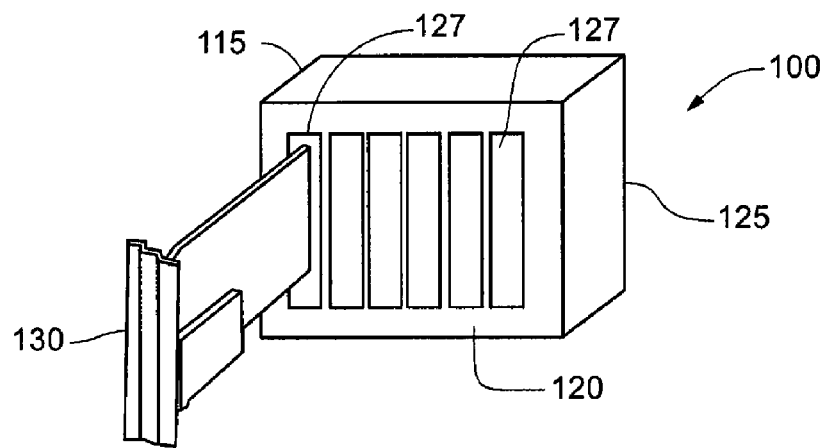
FIG. 1A is an illustration of an AdvancedTCA compliant shelf.

While the invention is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the spirit and scope of the invention as defined by the appended claims.

DETAILED DESCRIPTION OF THE INVENTION

Figure 1B:
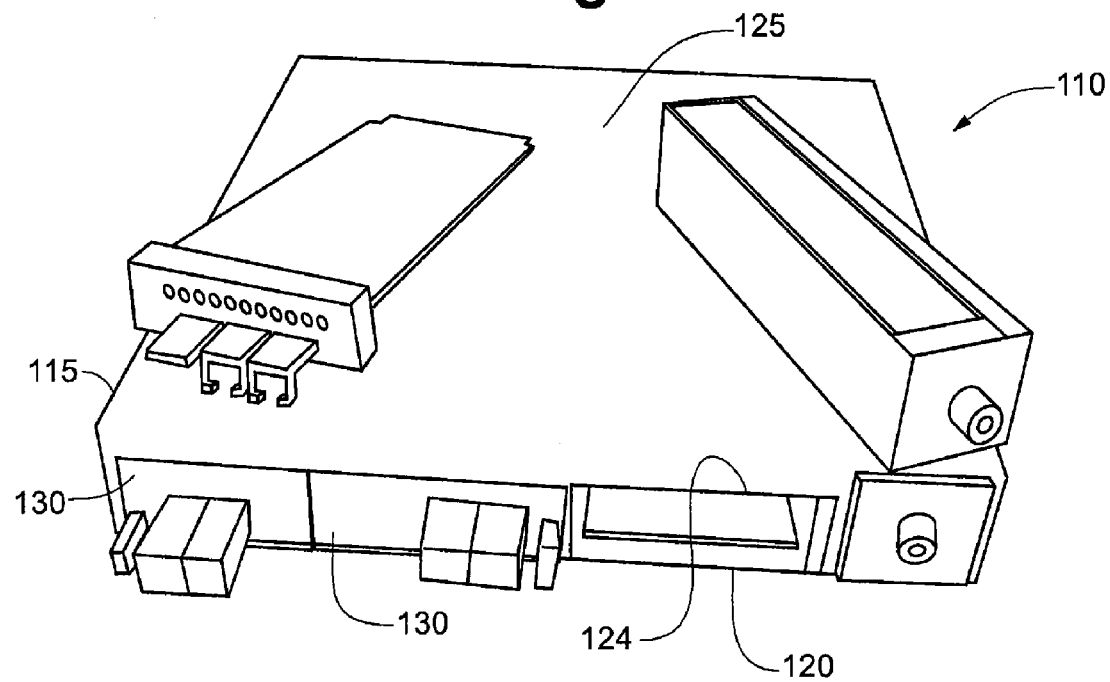
FIG. 1B illustrates a MicroTCA compliant shelf.

The present invention will be described in conjunction with the figures. In the various figures, like reference numerals refer to the same feature of the invention. FIGS. 1A and 1B illustrate an AdvancedTCA compliant shelf 100 and a MicroTCA compliant shelf 110 respectively according to the present invention. As depicted in FIGS. 1A and 1B, each of the AdvancedTCA compliant shelf 100 and the MicroTCA compliant shelf 110 typically consist of a rack (or cabinet) 115 with one or more chassis or shelves 120. Each shelf 120 has standardized physical dimensions and includes at least a generic backplane mesh 125 and slots 127 for modules 130. The modules 130 may be a field replaceable unit (FRU) comprising one or more of a server blade, a switch blade, a power supply module, a fan tray, a computing blade and a shelf management blade. The shelf 120 is typically cooled by forced air convection, although fan-based coolant arrangements may also be utilized. The ATCA backplane mesh 125 is configured with regions for system management, power distribution, data transport and I/O. For a more detailed description of one embodiment of a MicroTCA compliant shelf, reference is made to the previously identified U.S. Provisional Application No. 60/743,761, entitled "MODULAR CHASSIS-PROVIDING SCALABLE MECHANICAL, ELECTRICAL AND ENVIRONMENTAL FUNCTIONALITY FOR MICROTCA CARRIER BOARDS."

Figure 2:
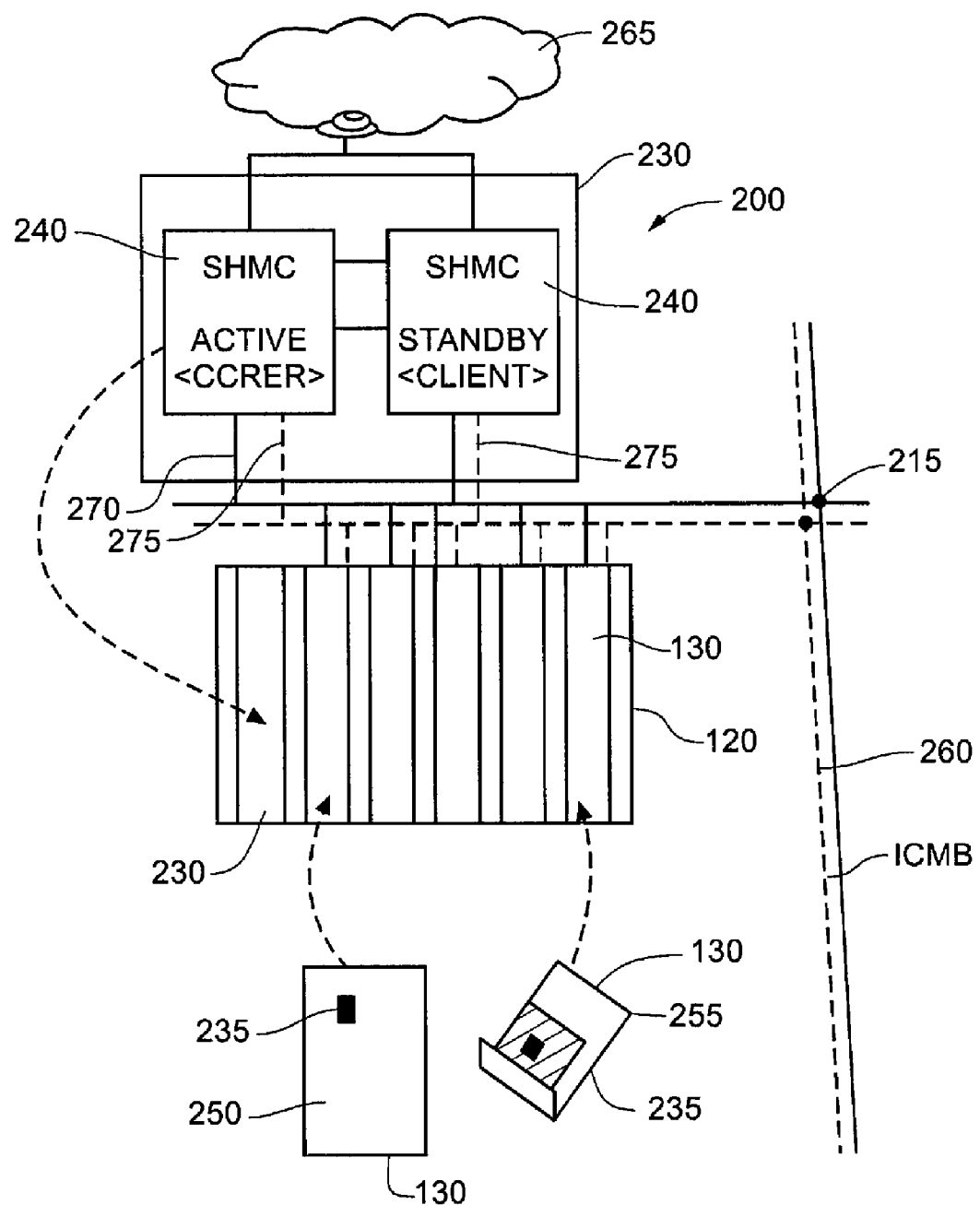
FIG. 2 depicts a shelf manager according to the present invention.

Referring now to FIG. 2, there is depicted a shelf manager 200 according to the present invention. The shelf manager 200 of the present invention is configured to provide a single point of interoperable control and management of modular AdvancedTCA and MicroTCA compliant platforms by implementing, for example, the Intelligent Platform Management Interface (IPMI) as defined by the PICMG 3.0 although the scope of the present invention is not circumscribed by any particular standard and other standards, currently in existence or later developed may be utilized within the scope of the present invention.

The IPMI is a standardized, abstracted, message-based interface to intelligent platform management hardware. IPMI protocol is defined in detail in Intelligent Platform Management Interface (IPMI) specification, Version 1.5, and Version 2.0 developed by a consortium including Intel Corporation, Hewlett-Packard Company, NEC Corporation, and Dell Computer Corporation, the disclosures of which are hereby incorporated herein in their entirety. One embodiment of the present invention is configured for adapting to the IPMI upgrade path including, for example, IPMI version 1.5 and version 2.0 and the IPMI standard as extended by PICMG 3.0 including the Intelligent Platform Management Interface 210, the Intelligent Platform Management Bus (IPMB) 215, the Intelligent Chassis Management Bus (ICMB) 220, the Shelf Management Controller (SHMC) 230, and the Intelligent Platform Management Controllers (IPMC) 235. Alternate embodiments of the present invention, envisage adaptation to other standards and specifications.

In one embodiment, each FRU 130 includes an IPMC 235 which implements a standardized interface based on IPMI v 1.5 for example. In a secondary embodiment, each FRU 130, such as a voltage or a thermal sensor, maybe managed by a IPMC 235. The IPMC 235 on the shelf manager is referred to as the shelf management controller (SHMC) 240. One of skill in the art will recognize that the term "shelf manager controller (ShMC)" is ATCA terminology designator for a device that hosts the IPMI firmware and resides within an ATCA shelf 120. Using the terminology of the ATCA specification, the BMC controller 240 would be termed an IPMC when it resides on an ATCA carrier board 250 or an MMC (Modular Management Controller when it resides on an Advanced Mezzanine Card (AMC) 255 hosted on the ATCA carrier board 250 without departing from the scope of the present invention. The ICMB 260 is a specialized bus that is used for chassis-to-chassis communication.

The IPMB 215 interconnects the IPMCs 235 with the ShMC 240. In one embodiment, this bus is physically a I2C-

Bus, which is a two wire serial interface used for intra-chassis communication between the ShMC 240 and the IPMCs 235. Shelf-to-Shelf communication maybe obtained through the ICMB 260. In an alternate embodiment, the ShMC 240 provides the interface between the Shelf-External System Manager software 265, the IPMCs 235 and the ICMB 260 to enable management of the shelf as a single system. This includes autonomous monitoring, event logging and recovery control. In an exemplary embodiment, the IPMB 215 (called the IPMB-0) is constructed dual redundant with every IPMC 235 connected to the SHMC 230 via a IPMB-A 270 and an IPMB-B bus 275. Each of the IPMI/IPMB-A and IPMI/IPMB-B topologies maybe configured as either radial or bussed as shown in FIG. 2.

The ATCA specifications to which the present invention is compatible, require the shelf manager to be implemented in a dual redundant configuration for conformance to the specification i.e. two shelf management controllers and dual redundant management bus to ensure fault tolerance. The outside-the-shelf system management software 265 interacts with the SHMC 230 using the Internet Protocol (IP) which is the primary network interface to outside-the-shelf entities. The Remote Management and Control Protocol (RMCP) is the messaging mechanism that provides IPMI over LAN functionality thereby enabling the system managers to communicate with ShMCs and the FRUs. The IPMI standard provides a specification for the IPMC (and ShMC) command sets, including command sets for sensors, event logs, and sensor data record access along with the specification for the data formats. The data forms utilized by IPMI include sensor data records, event log entries, and field replaceable unit (FRU) inventory entries. In one embodiment of the present invention, the layered architecture model provides an IPMI API layer that interfaces with a I2C device and in another embodiment, the IPMI API layer interfaces with a RMCP device (IPMI over LAN). Other protocols besides the I2C and RMCP may be used without digressing from the scope of the present invention.

Figure 3A:
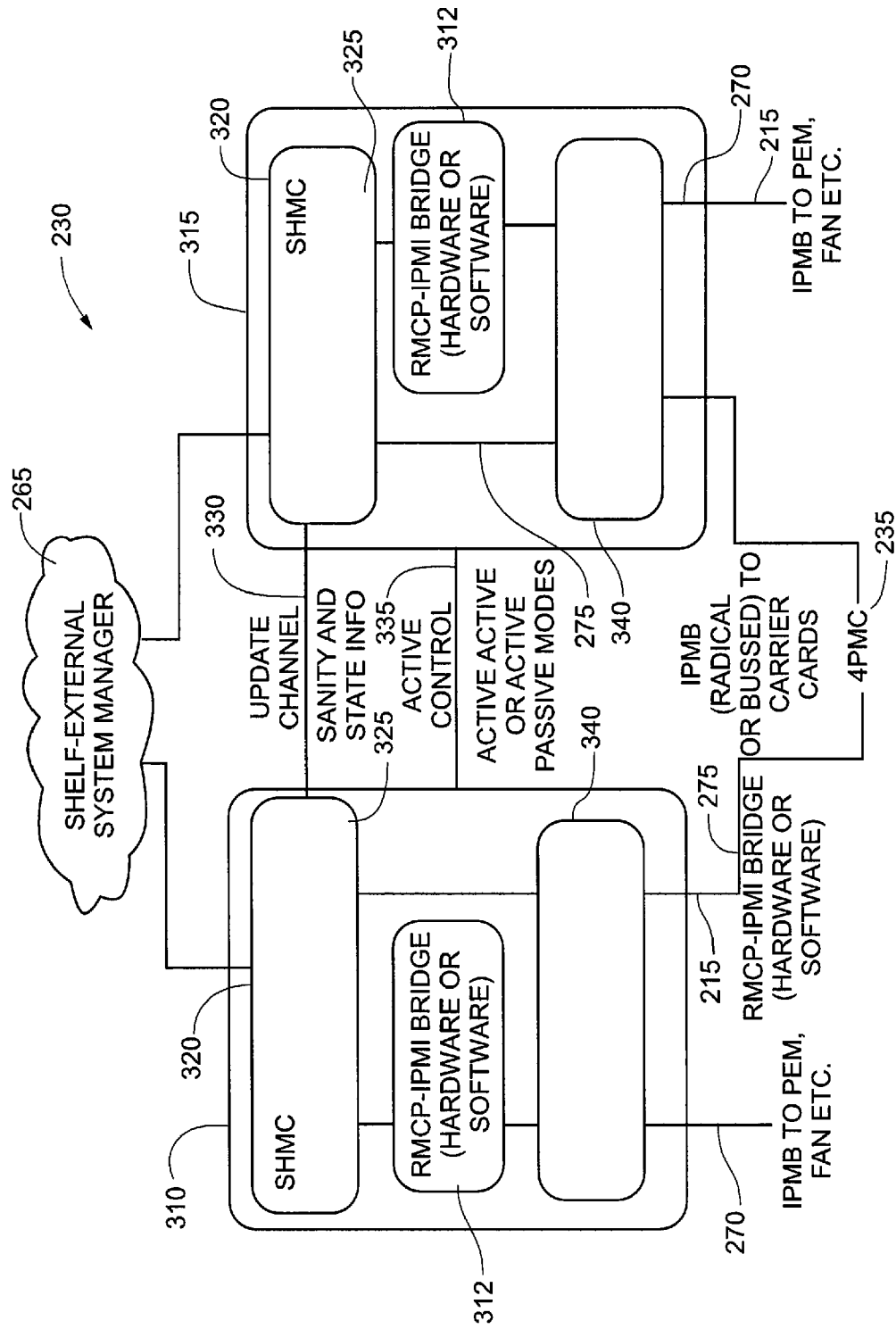
FIGS. 3A and 3B show a block diagram illustrating the shelf management controller (ShMC) according to a primary embodiment of the present invention.
Figure 3B:
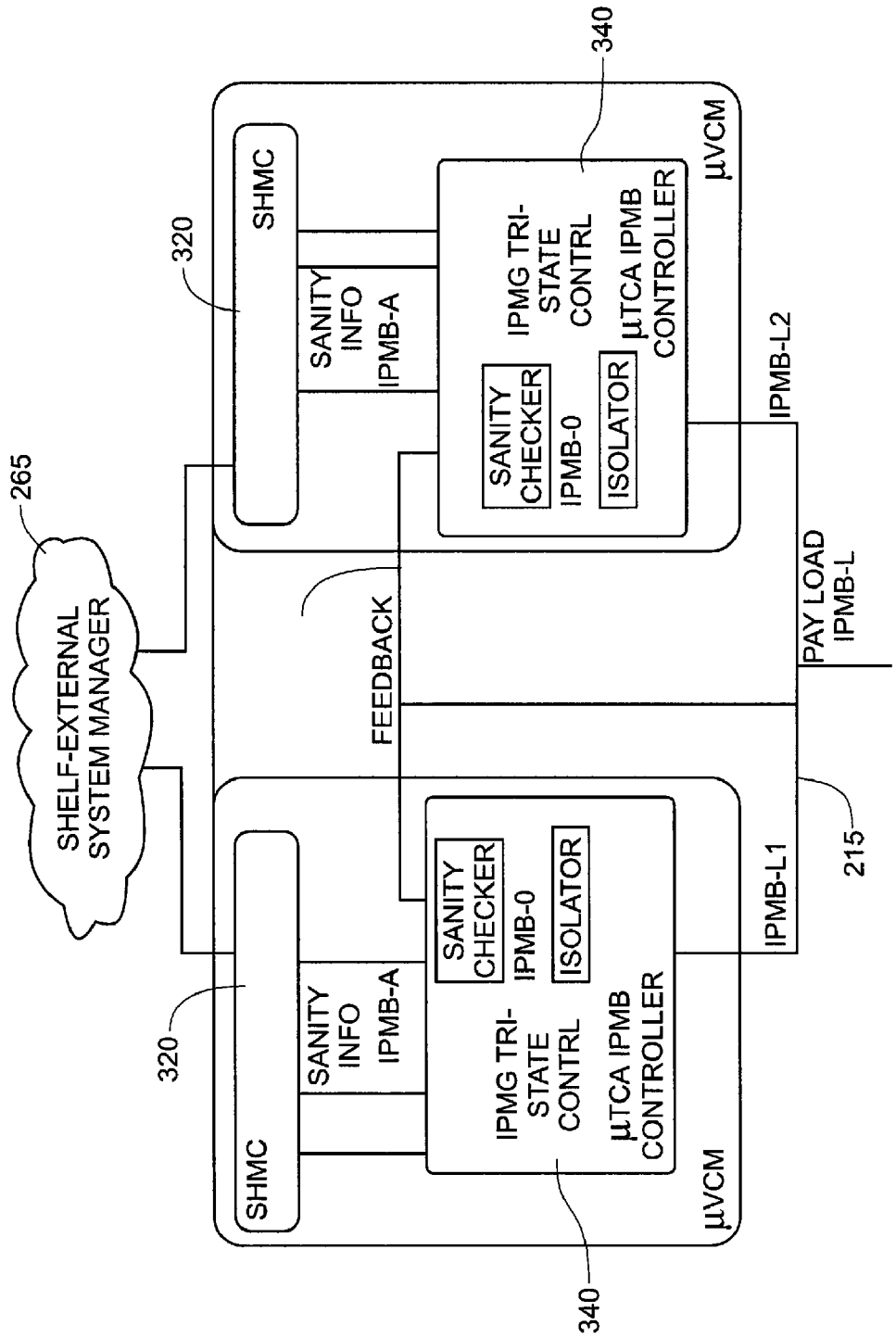

FIGS. 3A and 3B depict a block diagram illustrating the shelf management controller or ShMC 230 according to a primary embodiment of the present invention. As depicted in the block diagram of FIGS. 3A and 3B, the present invention provides a first SHMC 310 communicatively coupled with a second ShMC 315 in a symmetrical arrangement to provide a redundant shelf management solution utilizing active/standby architecture with automatic fail-over. In a first embodiment, each of ShMCs 310 and 315 are architecturally identical. Each ShMC 310(315) includes an independent processor 320 running a small footprint operating system (OS) 325 such as for example, the ucLinux OS with a thin stack. The ShMC 310 (315) operates on standby power and obtains system health variables by autonomously polling the Intelligent Platform Management Controllers (IPMC)s 235. The ShMC 310(315) is configured to detect an anomaly, log the event, generate and transmit alerts to notify the system of the anomaly and initiate recovery actions.

As depicted to FIG. 3A, each ShMC 310(315) is connected to at least two I2C/IPMB busses IPMB-A 270 and IPMB-B 275. ShMC 310(315) may be arranged in an active-active or active-passive I2C/IPMB failover modes. The primary embodiment of the present invention contemplates a unified message system which passes messages on an Abstracted Channel (AbCh). In the present invention, a channel is a physical link such as for example, I2C, JTAG, Update Channel and Free Space. In the Abstracted Channel view, each channel has attributes such as for example, client server channel (alternately referenced as requester-responder messaging scheme), peer channel, master slave channel which indicates the direction of queries and responses, capacity in terms of bandwidth, latency, and CoS or QoS, primary path, alternate path, feed back channel, such as for example, echoing or positive acknowledge messaging. The attributes are assumed to be programmable or hardware assisted with buffers, for instance. All attribute states can be probed at will and so can support registers for example. The Abstracted Channel allows the messaging system to route the messages at will or as the needs of a system change. In an exemplary embodiment, a GUI programming tool can be used to create one or more channels for a given hardware platform, to pass attributes to the hardware platform and to measure performance, run simulations, and so forth. One of skill in the art will readily recognize that the capability to execute instructions on an EEPROM enables the applications to be scaled.

Referring again to FIG. 3A, the IPMI messaging system model according to the present invention is depicted as a dual client-server messaging system. The client-server messaging scheme among multiple shelf components uses a channel abstraction layer to maintain layer independence. The ShMC 310 is communicatively coupled to ShMC 315 by a dedicated update channel 330 and an active control channel 335. The update channel 330 is adapted to be a bi-directional interface used to transmit sanity check and state information between the redundant shelf management controllers i.e. ShMCs 310 (315). Two instances of the client-server based messaging system run on each ShMC 310(315). In an exemplary embodiment, the active SHMC 310 (for instance) may be designated the server on system start-up, for example, without departing from the scope of the invention. The ShMC 315 will then be designated the client. The active ShMC 310 executes the command sets to perform shelf-management functions upon receiving state information from the IPMCs 235.

In the illustration embodiment of FIG. 3A and 3B, the independent processor 320 of the ShMC 310(315) is disposed in communication with, for example, a Bit Stream Processor (BSP) 340 disposed with at least one processor interface that is generic for all physical interface types including without limitation IPMI 1.5 over IPMB, Command Line Interface (CLI) over Serial Port, Telnet, and SSH Secure Shell. In one embodiment, the ShMC 310(315) includes a RCMP-IPMI bridge 312, implemented using the BSP 340 for example, that bridges RMCP and IPMB messages. For a more detailed description of the implementation details of a bridge between devices using disparate interfaces using the BSP 440, reference is made to the previously identified U.S. Provisional Application No. 60/761,129, entitled "SHELF MANAGEMENT CONTROLLER WITH HARDWARE/SOFTWARE IMPLEMENTED DUAL REDUNDANT CONFIGURATION," and the previously identified U.S. Pat. application Ser. No. 11/466,367, entitled "OMNI-PROTOCOL ENGINE FOR RECONFIGURABLE BIT-STREAM PROCESSING IN HIGH-SPEED NETWORKS,"

In an alternate embodiment, instead of the Bit Stream Processor there may be provided a CPU or other processor including an Ethernet controller (and/or an I2C controller) and equipped with a software stack that implements IPMI and RMCP. When a RMCP message packet is received from the system manager, the packet is opened and examined for UDP Port #. If the UDP Port # matches the IPMI message, the packet is stripped of its network header and a send message header (if any) is encapsulated. Then the message is sent to the appropriate interface. The SHMC kernel can request a "Copy Back" in a specific embodiment of the present invention. An IPMI message to the System Manager is encapsulated and sent over the System Manager Physical Port.

Figure 4A:
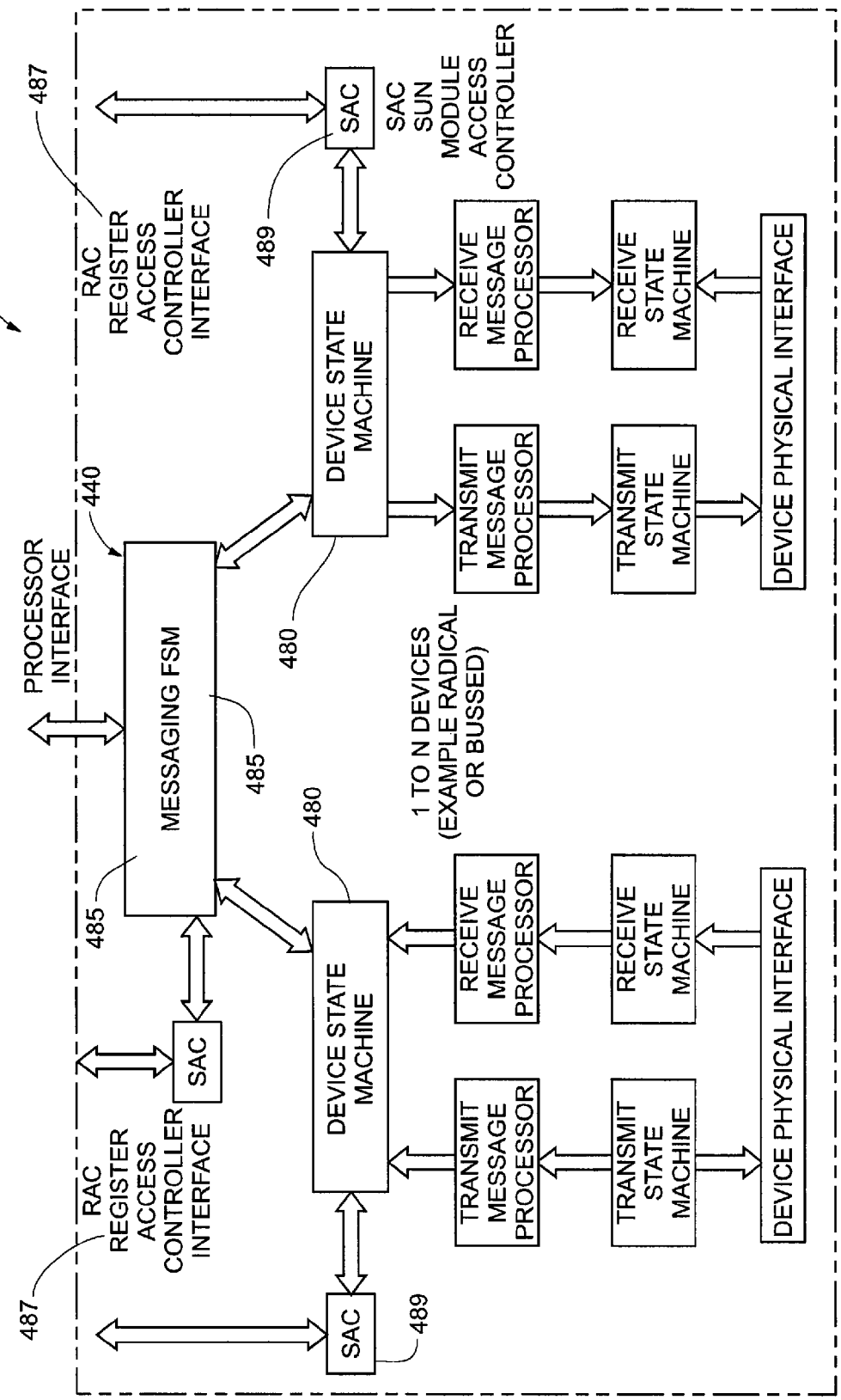
FIG. 4A illustrates an exemplary I2C hardware finite state machine (HFSM) implementation according to the present invention.
Figure 4B:
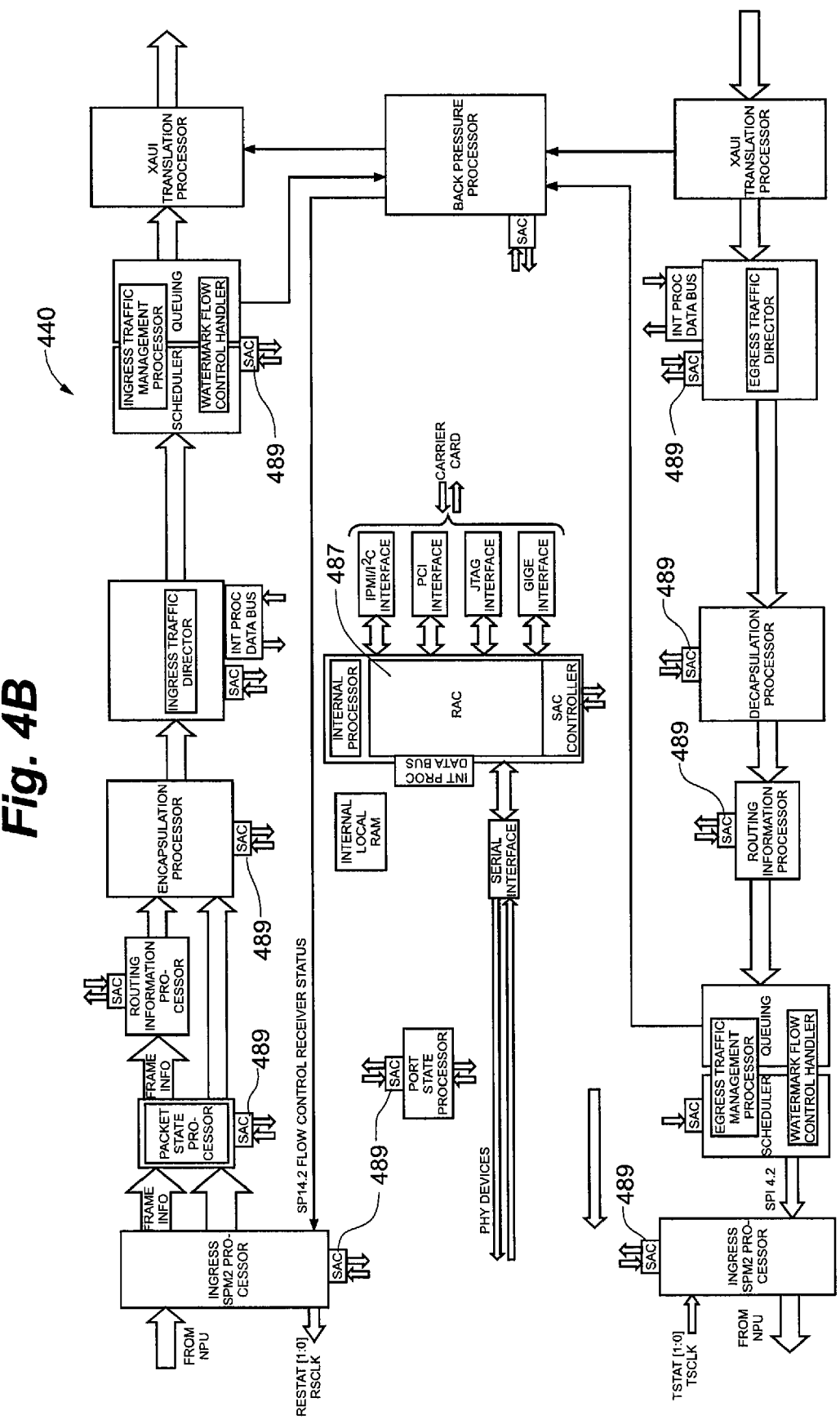
FIG. 4B is a block diagram illustrating an exemplary implementation of bridging between devices using various interfaces.

FIGS. 4A and 4B illustrate an exemplary implementation of the I2C hardware finite state machine (HFSM) 475 using the BSP 440. In an exemplary embodiment, the BSP is a CorEdge Networks 10G Multi-Protocol Bit Stream Processor described, for example, in previously identified application, U.S. patent application Ser. No. 11/466,367, entitled "OMNI-PROTOCOL ENGINE FOR RECONFIGURABLE BIT-STREAM PROCESSING IN HIGH-SPEED NETWORKS," and implemented in accordance with the present invention. It will be recognized that other bit steam processors implemented, for example, as cores in a field programmable gate array (FPGA) or application specific integrated circuit (ASIC) may be used in other embodiments of the present invention. The BSP is configured for wire speed packet data path processing of the bit-stream on the IPMB-A 270 and IPMB-B 275 buses. The BSP is adapted to assemble the bits in the bit-stream into defined protocol data (information) units and process the assembled protocol data (information) units to provide wire-speed throughput regardless of the protocol encountered. Both of these functions are dynamically programmable using, for example, the RAC/SAC (487/489) as discussed below. Thus, either the information units of a protocol or the processing rules that apply to the protocol data (information) units are inherently changeable in a dynamic manner.

In one embodiment, the HFSM 475 includes the BSP 440 configured with a selected sequence of pipelined stage engines. Each stage engine may have a different, extensible and reprogrammable architecture that causes an instantiation of a device finite state machine (DFSM) 480 for each IPMC 235 transmitting a message (e.g. system health, temperature, fan revolution etc) to the HFSM 475. The DFSMs 480 are advantageously configured for data flow communication to a stage engine of the BSP 440 adapted to instantiate a messaging finite state machine (MFSM) 485. Generally, the HFSM (as well as the DFSMs and the MFSM) uses three basic constructs. The HFSM maintains an action table that contains the action to perform when a given event is received while the FSM is in a given state, a next state table which contains the next state to enter when a given event is received while the FSM is in a given state and an event handler which drives the event processing when presented with an event, looks up and performs the necessary actions and updates the current state information. The stage machine (or the BSP or the FPGA) control and status register files are accessible through a Register Access Control (RAC) 487 mechanism whereby IPMI encapsulated messages are directed to the microprocessor in the stage machine (or BSP or FPGA) who then performs the actual register read or write. The microprocessor acts as a Register Access Controller (RAC) who interprets the RAC message, determines which forwarding logic element/Sub-module Access Controller (SAC) 489 the message is addressed and facilitates the register access with the SAC. Resulting status/response is return to the message originator. The RAC/SAC 487/489 provides a means to set or change the messaging methods per device (i.e. IPMC 235) on-the-fly, thus providing one mechanism that implements the level of programmability and flexibility of the present invention.

In one embodiment, the HFSM 475 is adapted to detect I2C bus failure as well as a device failure. If the failure is determined to be on a device monitored by one of the IPMCs 235, the SHMC 310 (315) isolates that device from accessing the backplane.

Referring again to FIG. 3A, the client 315 monitors the queries and responses of the active ShMC 310 using the update channel 330 and computes the states of the transactions and synchronizes these states with the active ShMC 310. In case the active ShMC 315 detects an error condition in the ShMC 310, it reports the event to the system manager 265 which acts as the referee and acts to remove the active ShMC 310 and enable the standby ShMC 315 to complete the failover without a time consuming state update. While the present embodiment is well suited for operation with AdvancedTCA compliant systems, it will also work in a MicroTCA environment where a tri-stated standby is prescribed as illustrated in FIG. 3B.

In a secondary embodiment, the ShMC 310(315) is augmented by a thin hardware assisted protocol stack. Another embodiment of the system implements an OS bypass scheme to assure a tiny and manageable ShMC implementation. The primary embodiment includes a EEPROM to execute instructions, such as for example an EEPROM with a TINY CHIP using system-on-chip (SOC) concepts, that would enable cost wise scaling of the capabilities of the ShMC processor 320.

In the primary embodiment, the dual redundant SHMC 310(315) configuration is used to introduce fault tolerant operation of the shelf management controller. In a first embodiment, checkpoints are inserted by adding an additional checkpoint state in the HFSM 475. When a current state in the HFSM 475 is the checkpoint state, a checkpoint process maybe initiated. On errors being indicated, the HFSM 475 may initiate a failover to ShMC 315 over the exclusive-use bus 335 and a recovery process initiated on ShMC 310 without introducing an abnormality in the ATCA shelf. The recovery process may be done by restoring faulty states internal to the SHMC 310 by replaying the logged states stored on SHMC 315 in their original order to recreate ShMC 310's pre-failure state. In a secondary embodiment, an additional ShMC (not illustrated) may be used to augment ShMC 310 (315) and the correct state is obtained by voting among the three or more copies of the states held between the three ore more ShMCs. In an exemplary embodiment, the voted results are loaded into the registers of each of the HFSMs 475 for purposes of resolving any conflicting votes.

Figure 5:
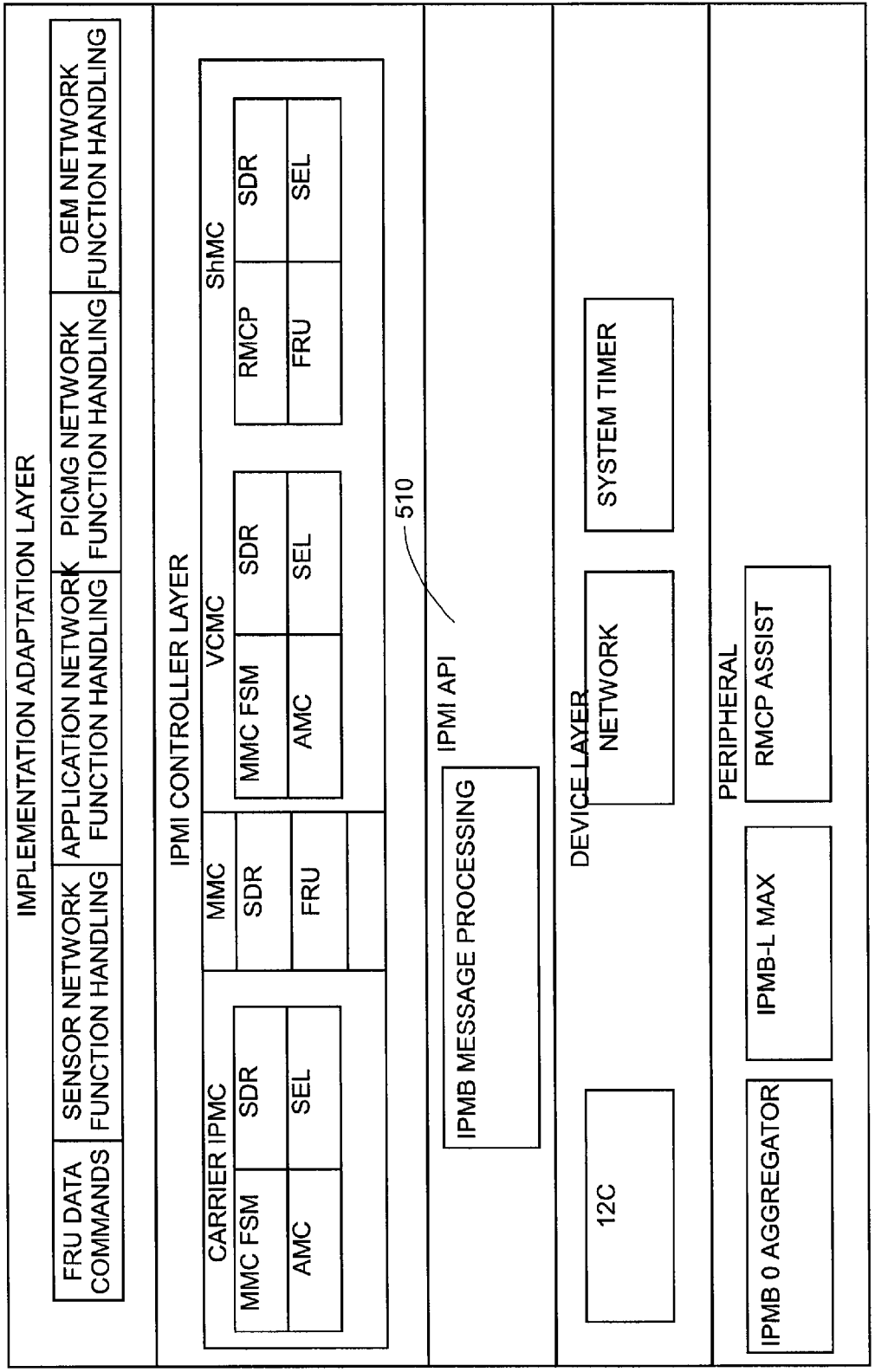
FIG. 5 is a schematic representation of the layered architecture according to the present invention.
Figure 6:
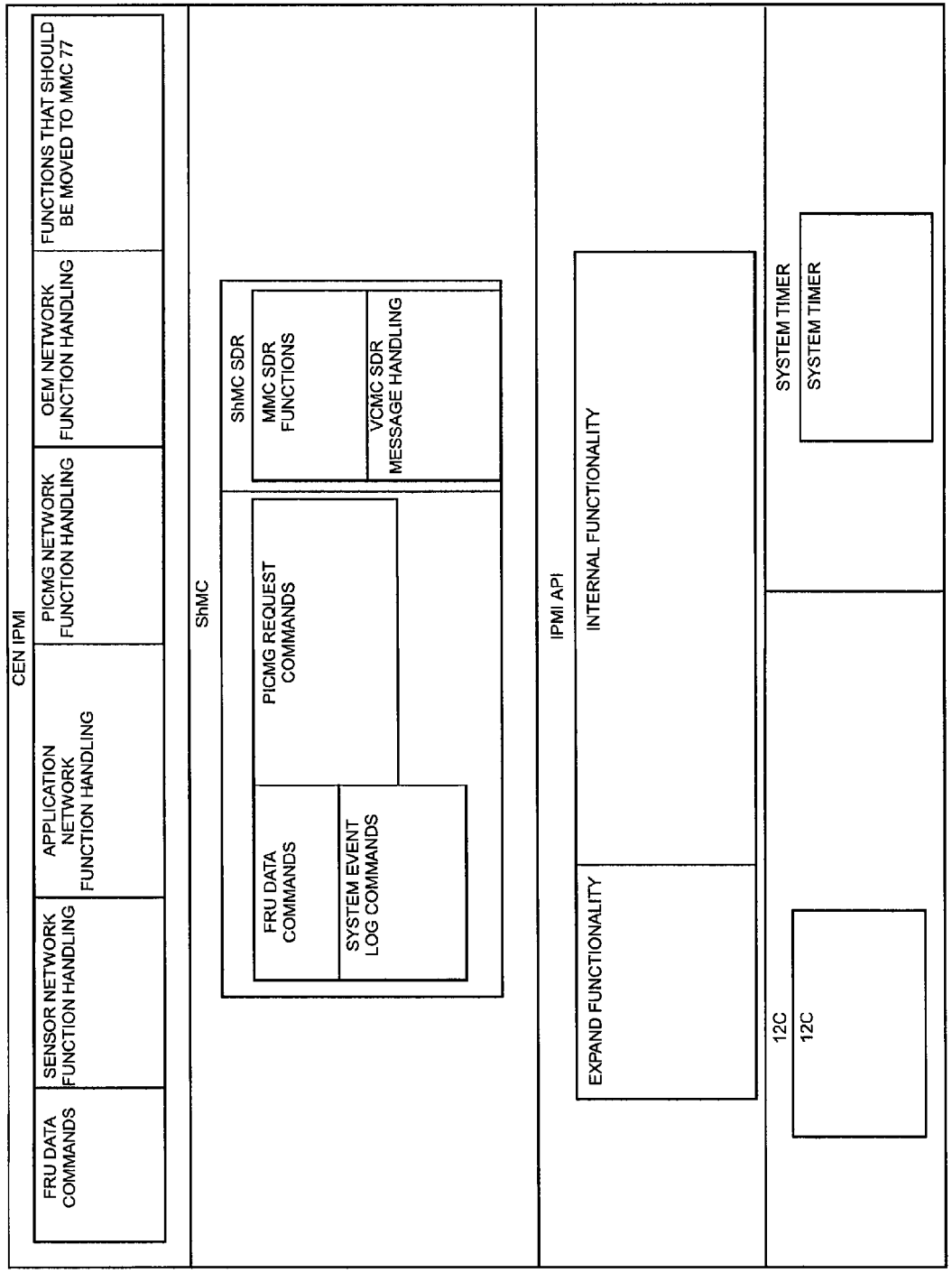
FIG. 6 illustrates the details of the layered architecture illustrated in FIG. 5.

FIGS. 5 and 6 illustrate the layered architecture of the present invention. FIG. 5 depicts an IPMI application programming interface (IPMI API) which is used to implement the FSMs of the previous section using software. One of skill in the art will recognize that each FSM of the previous section may be implemented through software executing on the ShMC processor. Use of alternate software algorithms to implement a particular fault tolerant scheme can help detect errors and make the system robust.

In an alternate embodiment, the IPMI API 510 is used to provide an IPMI v1.5 management infrastructure compliant with PICMG 3.0 within the shelf, but presenting the functionality of one or more of IPMI 1.0, 1.5, 2.0 and other evolving versions at its external management interface thus allowing an upgrade path to users whose needs cannot be met by the existing standards. In an exemplary embodiment, the aforementioned functionality is provided by IPMI middleware 610 that represents a software agent running in the OS 325. The middleware is a software-provided abstraction of the I2C/IPMI (or other interfaces such as JTAG, Update Channel, RAC/SAC) interface from the device IPMCs 235 that takes a IPMI version x based message and translates it into a consistent internal-to-the-shelf format (e.g. IPMI v. 1.5) compatible for communicating with the SHMC 310 and vice versa for communications emanating from the SHMC 310. In one embodiment, the middleware is packaged into a portable library. The ShMC controller processor executes the API software in an exemplary embodiment.

One of skill in the art will appreciate that the ability to utilize dissimilar interfaces (e.g. I2C, JTAG, Update Channel, RAC/SAC and Free Space) for interfacing devices (i.e. IPMC) to the SHMC, as well as the ability to utilize different software algorithms to translate a message from one interface to another, improves the detection of errors because it allows factoring out contributions (if any) by a particular interface or algorithm to the detected error. In this regard, the present invention contemplates the use of Remote Management Control Protocol (RMCP), Remote Procedure Calls (RPC), Simple Network Management Protocol (SNMP) v1 and v3 Gets, Sets, and Trap, IPMI 1.5, CLI over Serial Port, Telnet, and SSH Secure Shell.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. A redundancy based fault-tolerant system for providing at least one shelf management function for a shelf accommodating electronic components, the system comprising:
   at least two shelf management controllers associated with the shelf and disposed in an active-passive redundant configuration interconnected by a first connection link, the first connection link dedicated to communication between the at least two shelf management controllers, each shelf management controller communicatively coupled over at least a second connection link to at least one controlled device on the shelf and over at least a third connection link to at least one satellite controller located remotely from each of the at least two shelf management controllers, wherein each of the at least two shelf management controllers, the at least one controlled device and the at least one satellite controller is configured to communicate using an internal communication protocol associated with it; and
   a machine readable medium communicatively coupled to at least one access controller, the machine readable medium configured to store at least one data element and at least one instruction and is accessible to each of the at least two shelf management controllers via the access controller, wherein the access controller is configured to control access to, and to enable dynamic programming and reconfiguration of, the at least one data element and the at least one instruction, the at least one instruction is available to be executed by each of the at least two shelf management controllers and configured upon execution to implement an abstracted channel to allow the at least two shelf management controllers to communicate using messages carried over at least one of the connection links with a selected one of the at least one controlled device on the shelf and the at least one satellite controller to cause the shelf management controller to provide the at least one shelf management function despite incompatibilities between respective internal communication protocols associated with the at least two shelf management controllers, the at least one controlled device and the at least one satellite controller;
   wherein one of the at least two shelf management controllers is active and the other passive; and wherein the active shelf management controller provides the at least one shelf management function until a fail-over when the passive shelf management controller provides the at least one shelf management function.

2. The system of claim 1 wherein the abstracted channel further comprises a layered architecture configured to expose a first abstract interface with the at least two shelf management controllers and a second interface with each of the connection links.

3. A method for management of a redundant fault tolerant intelligent platform, including the steps of:
   providing a first and a second shelf management controllers;
   providing at least a first connection link communicatively coupled to and communicatively coupling each of the first and second shelf management controllers;
   providing at least second and third connection links communicatively coupled to and communicatively coupling each of the first and second shelf management controllers to at least one managed device on the platform;
   coupling each of the first and second shelf management controllers to a machine readable medium via at least one access controller;
   storing at least one data element and at least one instruction within the machine readable medium;
   implementing at least one abstracted channel by executing the at least one instruction and causing the instruction to operate on the at least one data element;
   disposing each of the first and second shelf management controllers in active mode wherein both controllers store state information about the at least one managed device; and controlling the managed device using the first shelf management controller via the intermediation of the abstracted channel until fail over in which case making the second shelf management controller take over the function of the first shelf management controller.

4. A redundancy based fault-tolerant shelf management system for a shelf accommodating electronic components, the system comprising:
   at least two shelf management controllers, at least one of which is disposed for operation in an active status mode and wherein each of the at least two shelf management controllers is:
      operably coupled to a dedicated physical communication link configured solely for data exchange between the at least two shelf management controllers, and
      operably coupled to at least one controlled device disposed on the shelf and at least one satellite controller located remote from each of the at least two shelf management controllers via at least two physical communication channels wherein each shelf management controller is capable of implementing at least one shelf management function by causing the transfer of at least a first management communication encoded according to a first communication protocol over at least one of the two physical communication channels and wherein a shelf management controller disposed in a standby status mode is capable of monitoring the operation of the at least one shelf management controller disposed in the active status mode through the data exchange over the dedicated physical communication link;

a machine-readable medium accessible to each of the at least two shelf management controllers, the machine-readable medium comprising a plurality of sets of instructions at least one of which is operative upon execution to generate an abstracted channel and to cause at least one of the at least two shelf management controllers to implement the at least one shelf management function over the abstracted channel; and at least one processor operably coupled to the machine-readable medium and adapted for cooperative operation with at least one of the at least two shelf management controllers, the at least one processor configured to dynamically add, modify and selectably execute one or more sets of instructions from among the plurality of sets of instructions to cause at least one of the at least two shelf management controllers to implement the at least one shelf management function;

wherein the shelf management controller disposed in the active status mode provides the at least one shelf management function until a fail-over, when the shelf management controller disposed in the standby status mode provides the at least one shelf management function.

5. The system of claim 4 wherein each of the at least two shelf management controllers is further operably coupled to:

a system manager, wherein upon detection by the shelf management controller in the stand-by status mode of an error condition in the shelf management controller in the active status mode, the shelf management controller in the stand-by status mode signals the system manager which removes the shelf management controller in the active status mode from operation and enables the shelf management controller in the stand-by mode to complete a fail-over and assume the active status mode.

6. The system of claim 4 wherein the shelf management controller in the stand-by status mode monitors at least one query and at least one response comprising transactions indicative of a first state of the shelf management controller in the active status mode using communications over the dedicated physical communication link wherein the shelf management controller in the stand-by mode maintains itself in a second state substantially synchronized with the first state.

7. The system of claim 4 wherein the data exchange between the at least two shelf management controllers over the dedicated physical communication link comprises sanity check and state information.

8. The system of claim 7 wherein the at least a first management communication using a first communication protocol comprises an Intelligent Platform Management Interface (IPMI) standard compliant message.

9. The system of claim 7 wherein the at least two physical communication channels comprise respective Intelligent Platform Management Bus (IPMB)-A and IPMB-B busses disposed in a dual-redundant configuration.

10. The system of claim 4 wherein each of the at least two shelf management controllers is disposed in an active status mode with each controller capable of monitoring the operation of the other controller thru the data exchange over the dedicated physical communication link and wherein each of the at least two shelf management controllers provides at least a portion of the at least one shelf management function until a failure of a first of the at least two shelf management controllers where upon a second of the at least two shelf management controllers provides the shelf management functionality.

11. The system of claim 4 wherein the machine readable medium further comprising at least a second set of instructions the execution of which results in instantiation of a layered environment executing on the at least one processor and the exposition of at least one interface to the layered environment adapted for handling communications transfer between the at least two shelf management controllers and the two physical communication channels.

12. The system of claim 11 wherein the layered environment presents at least one application programming interface (API) suitable for providing on-the-fly dynamic addition, modification and deletion of at least one set of instructions from amongst the plurality of sets of instructions resident in the machine readable medium.

\* \* \* \* \*